(12) United States Patent
Li et al.

(10) Patent No.: US 10,625,584 B2
(45) Date of Patent: Apr. 21, 2020

(54) LOWER STRUCTURE OF VEHICLE

(71) Applicants: TOYOTA JIDOSHA KABUSHIKI KAISHA, Toyota-shi (JP); TOYOTA JIDOSHA KYUSHU KABUSHIKI KAISHA, Miyawaka-shi (JP)

(72) Inventors: Linzhong Li, Okazaki (JP); Kenichi Tatsuguchi, Munakata (JP)

(73) Assignees: TOYOTA JIDOSHA KABUSHIKI KAISHA, Toyota-shi (JP); TOYOTA JIDOSHA KYUSHU KABUSHIKI KAISHA, Miyawaka-shi (JP)

( * ) Notice: Subject to any disclaimer, the term of this patent is extended or adjusted under 35 U.S.C. 154(b) by 0 days.

(21) Appl. No.: 16/256,299

(22) Filed: Jan. 24, 2019

(65) Prior Publication Data

US 2019/0232767 A1 Aug. 1, 2019

(30) Foreign Application Priority Data

Jan. 26, 2018 (JP) .................................. 2018-011902

(51) Int. Cl.
| | |
|---|---|
| *B60J 5/10* | (2006.01) |
| *B60R 25/20* | (2013.01) |
| *E05F 15/611* | (2015.01) |
| *E05F 15/73* | (2015.01) |
| *B60R 25/24* | (2013.01) |
| *B62D 35/02* | (2006.01) |
| *B60R 19/48* | (2006.01) |
| *E05B 81/78* | (2014.01) |

(52) U.S. Cl.
CPC .............. *B60J 5/10* (2013.01); *B60R 25/2054* (2013.01); *B60R 25/24* (2013.01); *E05F 15/611* (2015.01); *E05F 15/73* (2015.01); *B60R 19/48* (2013.01); *B62D 35/02* (2013.01); *E05B 81/78* (2013.01); *E05Y 2400/858* (2013.01); *E05Y 2900/532* (2013.01); *E05Y 2900/548* (2013.01)

(58) Field of Classification Search
None
See application file for complete search history.

(56) References Cited

U.S. PATENT DOCUMENTS

| | | | | |
|---|---|---|---|---|
| 9,845,632 | B2 * | 12/2017 | Dezorzi ................. | E05F 15/73 |
| 2011/0276234 | A1 * | 11/2011 | Van Gastel ............ | E05B 81/78 |
| | | | | 701/49 |
| 2012/0123649 | A1 * | 5/2012 | Eggers .................... | B60R 13/07 |
| | | | | 701/49 |

(Continued)

FOREIGN PATENT DOCUMENTS

JP 2015-21238 2/2015

*Primary Examiner* — Carlos Garcia
(74) *Attorney, Agent, or Firm* — Oblon, McClelland, Maier & Neustadt, L.L.P.

(57) ABSTRACT

A lower structure of a vehicle includes a rear bumper cover, a rear floor cover serving as an under cover that is provided at a lower side, in an up-and-down direction of the vehicle, than a floor panel of the vehicle and at a front side of the vehicle relative to the rear bumper cover, and a kick sensor having a signal line which extends in a width direction of the vehicle and a sensor part placed on the signal line. The kick sensor is placed inside a closed cross-section space surrounded by a connected structure of the rear bumper cover and the under cover and formed on the side of the floor panel, isolated from an outside of the vehicle.

11 Claims, 7 Drawing Sheets

(56) References Cited

U.S. PATENT DOCUMENTS

2015/0012176 A1* 1/2015 Schindler ............ B60W 50/08
701/36
2015/0025751 A1 1/2015 Sugiura et al.

* cited by examiner

LOWER STRUCTURE OF VEHICLE

CROSS REFERENCE TO RELATED APPLICATION

This application claims priority to Japanese Patent Application No. 2018-011902 filed on Jan. 26, 2018, which is incorporated herein by reference in its entirety including the specification, claims, drawings, and abstract.

TECHNICAL FIELD

The present disclosure relates to a lower structure of a vehicle, and in particular to a lower structure of a vehicle in which a kick sensor used for opening and closing a back door is placed.

BACKGROUND

In order to improve convenience of users when luggage is put into a luggage space at a rear side of a vehicle through a back door at a back surface side of the vehicle, a kick sensor is provided at a rear part of the vehicle. The kick sensor is a sensor which detects that the user has stuck out a foot tip to a lower side at the rear part of the vehicle, and, when the user approaches the back door in a closed state while carrying the luggage and sticks out the foot tip to the lower side of the vehicle, the kick sensor detects the sticking-out movement, and controls a back door opening/closing unit, so that the back door is automatically opened.

JP 2015-021238 A discloses provision of a kick sensor of a two-stage structure having an upper electrostatic sensor and a lower electrostatic sensor which extend in a width direction of the vehicle, at an inner side of a rear bumper cover of the vehicle. In this structure, for example, the lower sensor comprises three sensor parts placed in the width direction of the vehicle, and a spacing between adjacent sensor parts is set to 10~20 cm, which is about a typical width size between the feet of a human, to reduce possibility of erroneous detection of the foot tip of the user.

When the kick sensor for opening and closing the back door is provided inside the rear bumper cover, if foreign objects such as soil, rain, snow, or the like enter during traveling of the vehicle, an erroneous operation may occur. In consideration of this, there is desired a lower structure of a vehicle which suppresses entrance of the foreign objects into a placement region of the kick sensor, to thereby prevent the erroneous operation.

SUMMARY

According to one aspect of the present disclosure, there is provided a lower structure of a vehicle, comprising: a rear bumper cover; an under cover that is provided at a lower side, in an up-and-down direction of the vehicle, than a floor panel of the vehicle, and at a front side of the vehicle relative to the rear bumper cover; and a kick sensor that has a signal line which extends in a width direction of the vehicle, and a sensor part placed on the signal line, wherein the kick sensor is placed inside a closed cross-section space surrounded by a connected structure of the rear bumper cover and the under cover and formed on a side of the floor panel, isolated from an outside of the vehicle.

According to the above-described structure, because the kick sensor is placed inside a closed cross-section space formed on the side of the floor panel, isolated from the outside of the vehicle, it becomes possible to suppress entrance of foreign objects into a placement region of the kick sensor.

According to another aspect of the present disclosure, it is desirable that, in the lower structure of the vehicle, the under cover is a rear floor cover having an end on a front side of the vehicle connected to the floor panel and an end on a rear side of the vehicle connected to the rear bumper cover, and the kick sensor is placed at a portion of the rear floor cover in the closed cross-section space.

In the lower structure of the vehicle, in order to place the kick sensor in a manner to allow accurate detection of sticking out of the foot tip of the user, there is required a placement surface which has a certain length along a front-and-rear direction of the vehicle, and a suitable inclination angle along the front-and-rear direction of the vehicle, and which is a smooth curved surface. Depending on the specification of a design of a rear part of the vehicle or the like, there may be cases where a suitable placement surface for the kick sensor cannot be reserved on the rear bumper cover. In such a case also, according to the above-described structure, the kick sensor can be placed on the rear floor cover serving as the under cover. With this configuration, it becomes possible to place the kick sensor which can accurately detect sticking out of the foot tip of the user while satisfying the specification of the design of the rear part of the vehicle or the like.

According to another aspect of the present disclosure, it is desirable that, in the lower structure of the vehicle, the rear floor cover includes a plurality of floor cover rib portions integrated with and protruding from an inner wall surface facing the side of the floor panel, and that have a predetermined vertical wall thickness, the kick sensor includes a plurality of kick sensor locking portions, placed along a direction of extension of the signal line, each having a signal line retaining portion which supports the signal line by enclosing an outer circumferential side thereof, and a clip portion which is integrated with the signal line retaining portion and which can open and close in a front-and-rear direction of the vehicle, and the clip portion is locked to the floor cover rib portion.

According to the above-described structure, the kick sensor can lock the signal line by sandwiching the floor cover rib portion with the clip portion. In this manner, the kick sensor can detachably attached and fixed on the rear floor cover. Thus, unlike a case where the kick sensor is fixed with a double-sided adhesion sheet or the like, for example, exchange of the kick sensor is enabled, and fixation operation of the signal line can be facilitated. With such a configuration, the cost of fixation components such as the double-sided adhesion sheet or the like can be reduced, and a number of operation steps for attachment can also be reduced.

According to another aspect of the present disclosure, it is desirable that, in the lower structure of the vehicle, on the rear floor cover, a plurality of pairs of locking hook-leg elements are placed along the width direction of the vehicle, integral with an inner wall surface facing the side of the floor panel, each pair of locking hook-leg elements facing each other in a front-and-rear direction of the vehicle with a predetermined sandwiching space therebetween, and each locking hook-leg element having a locking hook at a top of a leg having a predetermined sandwiching height, and the kick sensor is locked by the signal line being sandwiched in the sandwiching space of the locking hook-leg elements.

According to the above-described structure, on the inner wall surface of the rear floor cover, because the pairs of the locking hook-leg elements each having the locking hook on the tip thereof are placed facing each other, the signal line can be fixed on the rear floor cover via the locking hook-leg elements by contacting and pressing the signal line between the pair of facing locking hooks. With this configuration, the fixation operation of the signal line can be facilitated, and the number of steps for the fixation operation can be reduced.

In addition, because the locking hook-leg elements are integrated with the rear floor cover, it becomes unnecessary to provide a special fixation component such as the double-sided adhesion sheet, the clip, or the like, and the cost can consequently be reduced. In this case, in order to integrally mold the locking hook at the top of the locking hook-leg element with the rear floor cover, in addition to one die for molding the overall outer shape, a slide die is required to leave a space between the legs which face each other, of the locking hook-leg elements. Depending on the specification of the lower structure of the vehicle, there may be cases where an upper side of the rear floor cover is not a completely open space, and the use of the slide die which slides in the up-and-down direction of the vehicle is difficult. In such a case also, with the use of a slide die which slides in the width direction of the vehicle, the locking hook-leg element can be integrally molded with the rear floor cover.

According to another aspect of the present disclosure, it is desirable that, in the lower structure of the vehicle, in the rear floor cover, a molding die passage hole corresponding to the sandwiching space is provided between the legs which face each other in the pair of the locking hook-leg elements.

According to the above-described structure, because the molding die passage hole is provided, two dies including an upper die and a lower die may be used, with the shape of the locking hook at the top of the locking hook-leg element therebetween, using the molding die passage hole. With this configuration, the integral molding of the locking hook-leg elements can be enabled without the use of the slide die.

According to another aspect of the present disclosure, it is desirable that, in the lower structure of the vehicle, the kick sensor is placed at a portion of the rear bumper cover in the closed cross-section space.

Depending on the specification of the design of the rear part of the vehicle or the like, a suitable placement surface for the kick sensor can be reserved on the rear bumper cover. In this case, the kick sensor can be placed on the portion of the rear bumper cover which is closer to the user at the rear side of the vehicle. Because the placement region of the kick sensor is the inside of the closed cross-section space surrounded by the connected structure of the rear bumper cover and the under cover and formed on the side of the floor panel, isolated from the outside of the vehicle, entrance of the foreign objects into the placement region of the kick sensor can be suppressed.

According to another aspect of the present disclosure, it is desirable that, in the lower structure of the vehicle, the kick sensor includes a plate with a locking hook in which, on an upper surface thereof, a plurality of pairs of locking hook-leg elements are placed along the width direction of the vehicle, each pair of locking hook-leg elements facing each other with a predetermined sandwiching space therebetween, and each locking hook-leg element having a locking hook at a top of a leg having a predetermined sandwiching height, and which has a plurality of attachment holes at an edge thereof, and the plurality of attachment holes of the plate with the locking hook are fastened and fixed by a fastening member to a plurality of attachment portions provided on an inner wall surface, of the rear bumper cover, facing the side of the floor panel.

According to the above-described structure, the plate with the locking hook can be fastened and fixed to the rear bumper cover using the attachment hole. With this configuration, because the kick sensor can be detachably attached and fixed to the rear bumper cover, unlike a case where the kick sensor is fixed using the double-sided adhesion sheet or the like, for example, exchange of the kick sensor is enabled. In addition, the fixation operation of the signal line can be facilitated, the cost of the fixation components such as the double-sided adhesion sheet or the like can be reduced, and the number of steps for the attachment operation can be reduced.

According to another aspect of the present disclosure, it is desirable that, in the lower structure of the vehicle, the rear bumper cover includes a plurality of bumper cover rib portions which are integrated with an inner wall surface facing the side of the floor panel, and which extend in a front-and-rear direction of the vehicle, the kick sensor includes a plurality of kick sensor locking portions, placed along a direction of extension of the signal line, each having a signal line retaining portion which supports the signal line by enclosing an outer circumferential side thereof, and a clip portion which is integrated with the signal line retaining portion and which can open and close in the width direction of the vehicle, and the clip portion is locked to the bumper cover rib portion.

According to the above-described structure, the kick sensor can lock the signal line by sandwiching the bumper cover rib portion with the clip portion. With this configuration, the kick sensor can be detachably attached and fixed to the rear bumper cover, and thus, unlike a case where the kick sensor is fixed using the double-sided adhesion sheet or the like, for example, exchange of the kick sensor can be enabled. In addition, the fixation operation of the signal line can be facilitated, the cost of the fixation components such as the double-sided adhesion sheet can be reduced, and the number of steps for the attachment operation can be reduced.

According to another aspect of the present disclosure, it is desirable that the lower structure of the vehicle further comprises a muffler that is provided at a lower side, in the up-and-down direction of the vehicle, than the floor panel of the vehicle, and at a front side of the vehicle relative to the rear bumper cover, the under cover is a heat insulator which is provided between the muffler and the rear bumper cover, which extends to the front side of the vehicle between an upper surface of the muffler and the floor panel, and which has an end on the rear side of the vehicle connected to the rear bumper cover, and the kick sensor is placed at a portion of the rear bumper cover in the closed cross-section space.

Depending on the vehicle, there may be cases where the vehicle does not have the rear floor cover for reducing an air resistance of a lower surface flow flowing between a lower surface side of the vehicle and a road surface during traveling of the vehicle, but because there are only a small number of restrictions such as the design of the rear part of the vehicle, a suitable placement surface for the kick sensor can be reserved on the rear bumper cover. In correspondence to such a vehicle, according to the above-described structure, because the heat insulator serving as the under cover is connected to the rear bumper cover to form the closed cross-section space, the kick sensor placed on the rear bumper cover is provided inside the closed cross-section space, and entrance of the foreign objects into the placement region of the kick sensor can be suppressed.

According to the lower structure of the vehicle described above, entrance of foreign objects into the placement region of the kick sensor can be suppressed, and erroneous operation can be prevented.

BRIEF DESCRIPTION OF DRAWINGS

Embodiment(s) of the present disclosure will be described by reference to the following figures, wherein.

DESCRIPTION OF EMBODIMENTS

Figure 1:
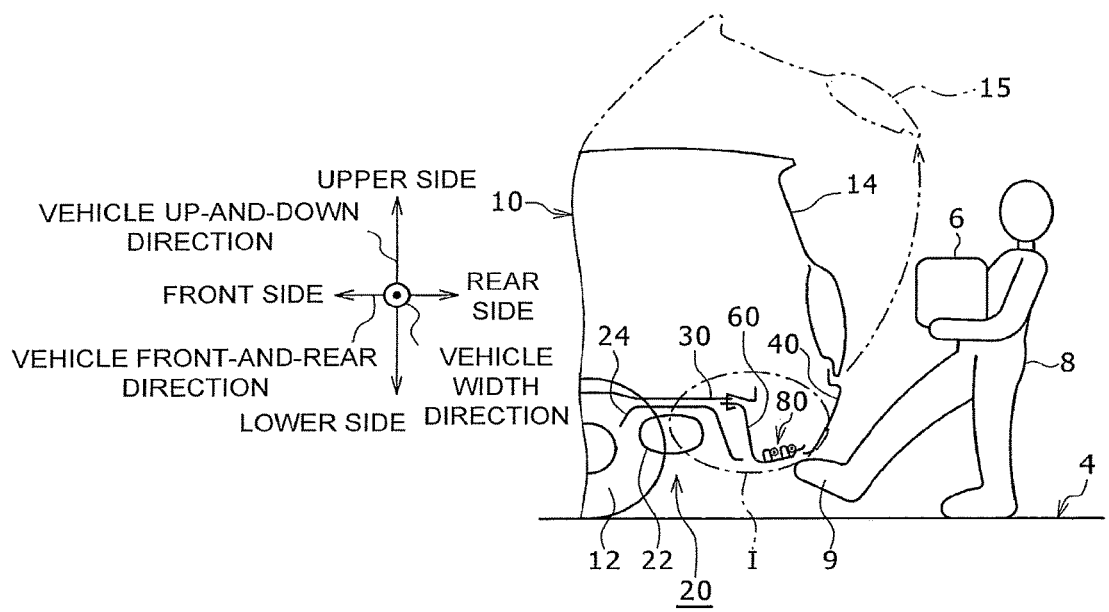
FIG. 1 is a cross-sectional diagram showing a lower structure of a vehicle according to an embodiment of the present disclosure.

An embodiment of the present disclosure will now be described in detail with reference to the drawings. In the following description, a lift gate-type back door will be exemplified, but this structure is merely exemplary for explanation, and the back door may alternatively be of a side-opening type.

A shape, a material, or the like described below are exemplary for the purpose of explanation, and may be suitably changed depending on a specification of the lower structure of the vehicle or the like. In addition, in the following, elements similar in the drawings are assigned the same reference numerals and will not be repeatedly described.

FIG. 1 is a cross-sectional diagram showing a vehicle lower structure 20 in a vehicle 10. In the following, unless otherwise noted, the vehicle lower structure 20 will also be simply referred to as a "lower structure 20." FIG. 1 is a cross-sectional diagram of a rear side of the vehicle in the vehicle 10, and shows a rear wheel 12, and a back door 14 provided on a back surface side of the vehicle 10. FIG. 1 also shows a road surface 4, a user 8 holding luggage 6, and a foot tip 9 of the user 8, although these are not constituting elements of the lower structure 20.

FIG. 1 shows, as the lower structure 20 and in the vehicle 10, a structure on the rear side of the vehicle in which a kick sensor 80 used for opening and closing the back door 14 is placed. The lower structure 20 comprises, in addition to the kick sensor 80, a muffler 22, a heat insulator 24, a floor panel 30, a rear bumper cover 40, and a rear floor cover 60.

The muffler 22 is a muffling and exhaust device for suppressing an exhaust sound of exhaust gas from an engine (not shown) of the vehicle or the like. The heat insulator 24 is a heat shielding member which protects adjacent vehicle-mounted components against heat of the muffler 22 through which a high-temperature exhaust gas passes.

The floor panel 30 is a panel member which is placed on a floor surface of the vehicle 10 and which partitions a vehicle cabin side and an outside of the vehicle. Here, the outside of the vehicle refers to the side of the road surface 4, and is a space where foreign objects such as traveling wind, dust, dirt, rain, snow, or the like exist, as opposed to the vehicle 10.

The rear bumper cover 40 is an exterior member of a rear bumper which is provided at the rear side of the vehicle for reducing an impact experienced by the vehicle 10. The rear bumper cover 40 is molded with a suitable synthetic resin, and has a function to deform toward an inner side of the vehicle when an external force of greater than or equal to a predetermined magnitude is applied, to absorb the impact.

The rear floor cover 60 is one type of an under cover provided at a lower side in the up-and-down direction of the vehicle than the floor panel 30 of the vehicle 10 and at a front side of the vehicle relative to the rear bumper cover 40. The rear floor cover 60 is provided particularly for reducing an air resistance of a lower surface flow flowing between a lower surface side of the vehicle 10 and the road surface 4 during traveling of the vehicle. Details of the rear floor cover 60 will be described later.

The kick sensor 80 is a sensor provided at the rear part of the vehicle, for improving convenience of the user 8 when opening or closing the back door 14 in the vehicle 10 having the back door 14. As shown in FIG. 1, the user 8 particularly carrying the luggage 6 with both hands cannot open or close the back door 14 with the hands. The kick sensor 80 is a sensor which detects that the user 8 has stuck out the foot tip 9 toward a lower side at the rear part of the vehicle 10. For example, when the user 8 approaches the back door 14 in the closed state while carrying the luggage 6 and sticks out the foot tip 9 toward the lower side of the vehicle, the kick sensor 80 detects this motion. According to the detection result, a back door opening/closing unit (not shown) is controlled, and the back door 14 is automatically opened, to a state of a back door 15 popped to the upper side of the vehicle 10, as shown by a two-dots-and-chain line.

In the following drawings, a width direction of the vehicle, a front-and-rear direction of the vehicle, and an up-and-down direction of the vehicle are suitably shown. With regard to the width direction of the vehicle, a right side of the vehicle is a direction of right side, and a left side of the vehicle is a direction of the left side, when the vehicle 10 is viewed from a rear side toward a front side. With regard to the front-and-rear direction of the vehicle, a direction shown by "FR" is a front-side direction of the vehicle, and an opposite direction is a rear-side direction of the vehicle.

With regard to the up-and-down direction, a direction shown by "UP" is an upward direction at the upper side relative to the road surface, and the opposite direction is the lower side direction on the road surface side.

In some cases, the right side direction and the left side direction in relation to the width direction of the vehicle, the front side direction of the vehicle, and the rear side direction of the vehicle may be referred to as a right side, a left side, a front side, and a rear side.

Figure 2:
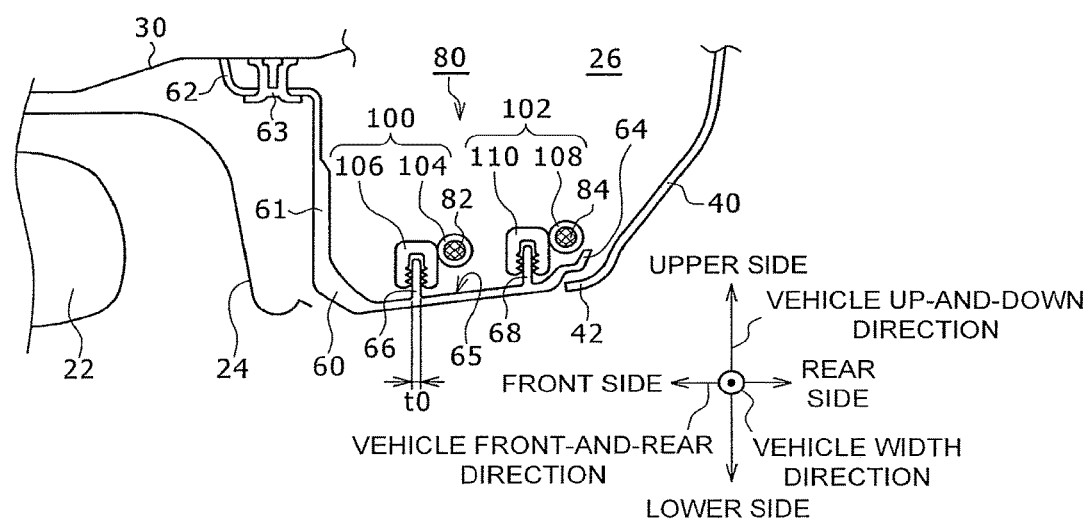
FIG. 2 is an enlarged view of a part I of FIG. 1.

FIG. 2 is an enlarged view of a part I of FIG. 1. The rear floor cover 60 is a member which extends in the width direction of the vehicle, and extends in the front-and-rear direction of the vehicle. The rear floor cover 60 has, on the front side of the vehicle, a vertical wall 61 which extends toward the upper side of the vehicle toward the side of the floor panel 30, and an end 62 of the vertical wall 61 on the front side of the vehicle is connected to the floor panel 30 by a suitable fixation member 63. In addition, an end 64 on the rear side of the vehicle is connected to an end 42 of the rear bumper cover 40 on the front side of the vehicle. The connection between the end 64 of the rear floor cover 60 and the end 42 of the rear bumper cover 40 can be any connection which allows smooth flow of the traveling wind outside of the vehicle, and which prevents entrance of foreign objects such as dust, rain, and snow. Thus, the connection may be a connection by placement of a micro-gap such as a labyrinth, in place of the use of a fixation means. With this configuration, a closed cross-section space 26 which is closed with respect to the outside of the vehicle is formed by a connected structure of the rear bumper cover 40 and the rear floor cover 60. For the rear floor cover 60, a member which is molded in a predetermined shape using a suitable synthetic resin is used.

Because the closed cross-section space 26 is a space into which the foreign objects from the outside of the vehicle do not enter, the kick sensor 80 is placed inside the closed cross-section space 26. With this configuration, an erroneous operation of the kick sensor 80 by the foreign objects from the outside of the vehicle can be prevented. In the closed cross-section space 26, the determination of whether the kick sensor 80 is to be placed on the side of the rear floor cover 60 or on the side of the rear bumper cover 40 may be made based on the specification of the vehicle 10 or the like. In the lower structure 20, in order to place the kick sensor 80 to accurately detect the sticking-out of the foot tip 9 of the user 8, there is necessary a placement surface which has a certain length along the front-and-rear direction of the vehicle, and a suitable inclination angle along the front-and-rear direction of the vehicle, and which is a smooth curved surface. Depending on the specification of the design of the rear part of the vehicle or the like, there may be cases where a suitable placement surfaces for the kick sensor 80 cannot be reserved on the rear bumper cover 40. In such cases, the kick sensor 80 is placed at a portion of the rear floor cover 60 in the closed cross-section space 26. On the other hand, depending on the specification of the design of the rear part of the vehicle 10 or the like, when the suitable placement surface for the kick sensor 80 can be reserved on the rear bumper cover 40, the kick sensor 80 is placed at a portion of the rear bumper cover 40 at a side nearer to the user 8 at the rear side of the vehicle, in the closed cross-section space 26.

In any case, because the kick sensor 80 is placed in the closed cross-section space 26 while satisfying the specification of the design of the rear part of the vehicle 10 or the like, entrance of the foreign objects from the outside of the vehicle into the placement region of the kick sensor 80 can be suppressed, and the erroneous operation of the kick sensor 80 can be prevented. In the following description, a case will first be described in which the kick sensor 80 is placed at the portion of the rear floor cover 60 in the closed cross-section space 26, and then, a case will be described in which the kick sensor 80 is placed at the portion of the rear bumper cover 40.

Figure 3:
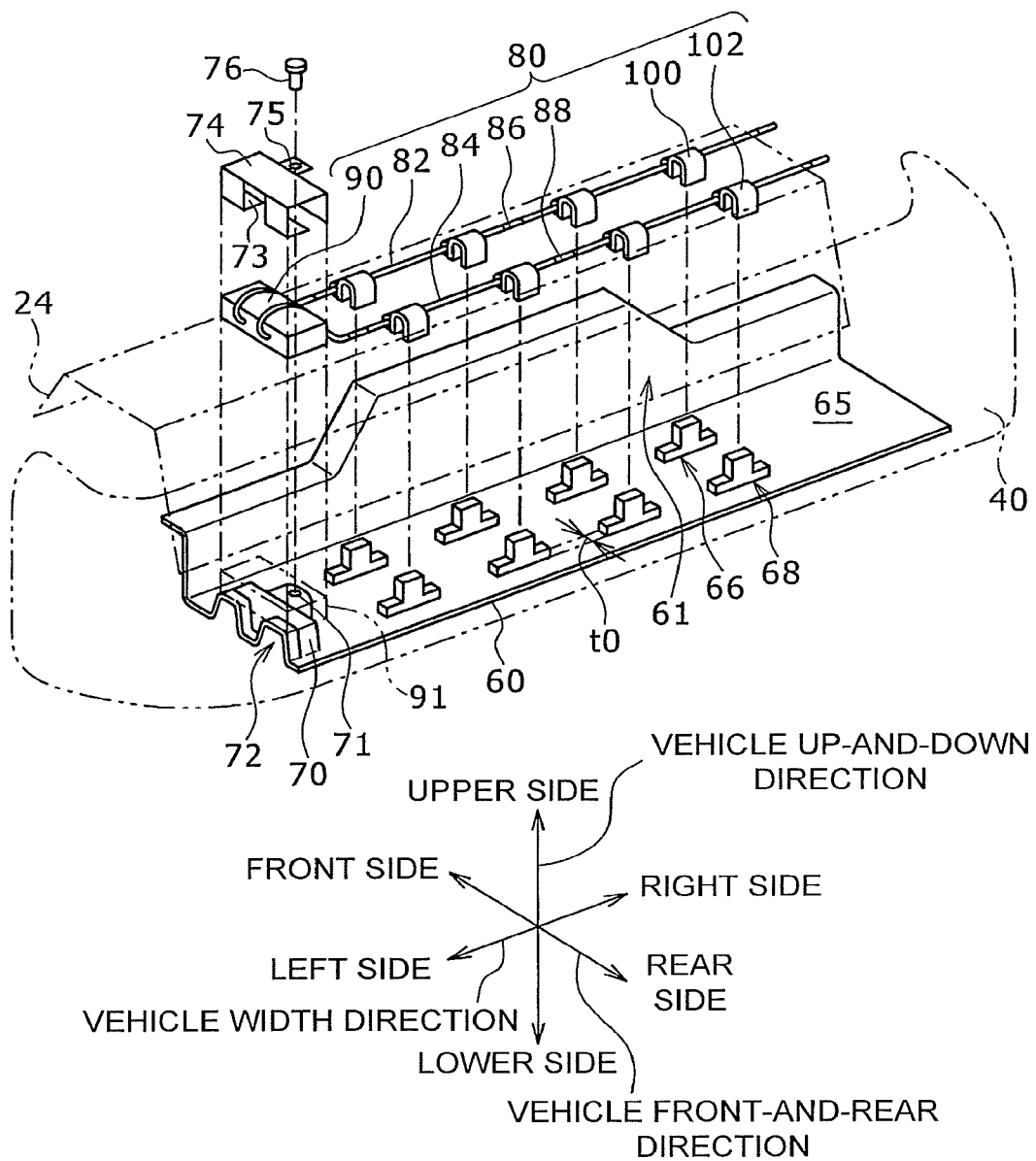
FIG. 3 is a perspective diagram showing a kick sensor placed on a rear floor cover in a lower structure of a vehicle according to an embodiment of the present disclosure.

FIG. 3 is a perspective diagram showing the kick sensor 80 placed on the rear floor cover 60. FIG. 3 shows a state immediately before the kick sensor 80 is attached to and fixed on the rear floor cover 60.

The kick sensor 80 includes two signal lines 82 and 84 extending in the width direction of the vehicle, a plurality of sensor parts 86 and 88 placed on the signal lines 82 and 84, and a sensor signal processor 90. The sensor signal processor 90 is a control circuit which receives detection results of the sensor parts 86 and 88, applies signal processing, and outputs a command signal to the back door opening/closing unit (not shown).

The sensor parts 86 and 88 are electrostatic sensors which have sensor electrodes and which detect changes in electrostatic capacitance with the foot tip 9 of the user 8, which is a detection target. Alternatively, in place of detecting the change in the electrostatic capacitance, there may be used a sensor which generates an electric field between sensor electrodes and which detects a change of an electric wave caused by the detection target. A plurality of the sensor parts 86 and 88 are placed along the width direction of the vehicle to enable detection at any position of the user 8 along the width direction of the vehicle. In the example configuration of FIG. 3, two rows of the sensor parts are provided respectively at a right side end, a left side end, and a central side of the vehicle, totaling 6 sensor units. This is merely exemplary for the purpose of the explanation, and the number and placement positions of the sensor parts 86 and 88 may be suitably changed according to the specification of the vehicle 10 or the like.

The two signal lines 82 and 84 are detection signal lines for transmitting detection signals from the three sensor parts 86 and 88 to the sensor signal processor 90. Two signal lines 82 and 84 are used in order to prevent an erroneous detection related to reliably detecting the sticking-out of the foot tip 9 of the user 8 toward the side of the kick sensor 80. For example, when the detection signals are transmitted from both of the signal line 82 and the signal line 84, the sensor signal processor 90 judges that the user 8 has an intention to open or close the door. On the other hand, with only the detection signal from only one of the signal line 82 and the signal line 84, the sensor signal processor 90 does not judge that the user 8 has an intention to open or close the back door 14. With this configuration, it is possible to appropriately prevent erroneous detection of the kick sensor 80.

For attaching and fixing the kick sensor 80 onto the rear floor cover 60, a plurality of floor cover rib portions 66 and 68 are provided on the rear floor cover 60, and the kick sensor 80 has a plurality of kick sensor locking portions 100 and 102 corresponding thereto. The floor cover rib portion 66 and the kick sensor locking portion 100 attach and fix the signal line 82 onto the rear floor cover 60. The floor cover rib portion 68 and the kick sensor locking portion 102 attach and fix the signal line 84 onto the rear floor cover 60.

The floor cover rib portions 66 and 68 are a plurality of protrusion ribs which are integrated with and protrudes from an inner wall surface 65 facing the side of the floor panel 30, and which has a predetermined vertical wall thickness t0. In the example configuration of FIG. 3, in correspondence to the extension of the signal lines 82 and 84 in the width direction of the vehicle, two rows of 4 floor cover rib portions 66 and 68, totaling 8 rib portions, are placed along the width direction of the vehicle, on the inner wall surface 65. The vertical wall thickness t0 is a thickness along the front-and-rear direction of the vehicle.

In correspondence to the placement of the floor cover rib portions 66 and 68, 4 kick sensor locking portions 100 and 102 are placed along the signal line 82 and 4 kick sensor locking portions 100 and 102 are placed along the signal line 84, totaling 8 locking portions. The 8 kick sensor locking portions 100 and 102 have different placement positions along the signal lines 82 and 84, but have similar structures. Thus, in the following description, a structure of the kick sensor locking portion 100 provided on the signal line 82 will primarily be described with reference to the cross-sectional diagram of FIG. 2.

The kick sensor locking portion 10 has a signal line retaining portion 104 which supports the signal line 82 by enclosing an outer circumferential side thereof, and a clip portion 106 which is integrated with the signal line retaining portion 104 and which can open and close in the front-and-rear direction of the vehicle. Because the signal line retaining portion 104 encloses the signal line 82, an insulator is desirably used. For example, a wound structure such as a resin tape may be used as the signal line retaining portion 104. For the clip portion 106, an alligator clip which can open and close may be used. As the clip portion 106, a plastic alligator clip which is urged in a normally-closed state may be used. Alternatively, in place of this configuration, a metal alligator clip may be used. As a method of integrating the clip portion 106 and the signal line retaining portion 104, an adhesive or the like may be used. This configuration is merely exemplary for the purpose of explanation, and any other structure may be used so long as the portion enclosing the signal line 82 and the clip portion are connected as an integral structure.

The kick sensor locking portion 102 similarly has a signal line retaining portion 108 which supports the signal line 84 by enclosing an outer circumferential side thereof, and a clip portion which is integrated with the signal line retaining portion 108 and which can open and close in the front-and-rear direction of the vehicle. The kick sensor locking portions 100 and 102 provided respectively on the signal lines 82 and 84 are locked to the floor cover rib portions 66 and 68, respectively, using the clip portions 106 and 110.

Referring back to FIG. 3, a holding base portion 91 provided at a left side of the inner wall surface 65 of the rear floor cover 60 and a hook accepting portion 72 formed at a left end of the rear floor cover 60 are members for fixing the sensor signal processor 90 on the rear floor cover 60. On the holding base portion 91, a female screw hole 71 for fixing the sensor signal processor 90 is formed. The sensor signal processor 90 is placed on the holding base portion 91 by being held by a holding plate portion 74 having a locking hook 73. In this process, the locking hook 73 of the holding plate portion 74 is fitted to the hook accepting portion 72 of the rear floor cover 60. A fixation screw 76 is then inserted into a fixation hole 75 formed on the holding plate portion 74 holding the sensor signal processor 90, and is fastened using the female screw hole 71 of the holding base portion 91. In this manner, the sensor signal processor 90 is fixed on the rear floor cover 60.

According to the structure described above, the signal lines 82 and 84 can be detached from the floor cover rib portions 66 and 68 by opening the clip portions 106 and 110. In addition, by loosening and detaching the fixation screw 76, the sensor signal processor 90 can be detached from the holding base portion 91. In this manner, the kick sensor 80 can be detachably attached and fixed onto the rear floor cover 60. Thus, for example, unlike the case where the kick sensor 80 is fixed using a double-sided adhesion sheet or the like, the kick sensor 80 can be exchanged. In addition, the fixation operation of the signal lines 82 and 84 can be facilitated, the cost of the fixation components such as the double-sided adhesion sheet or the like can be reduced, and a number of steps for the attachment operation can be reduced.

Figure 4A:
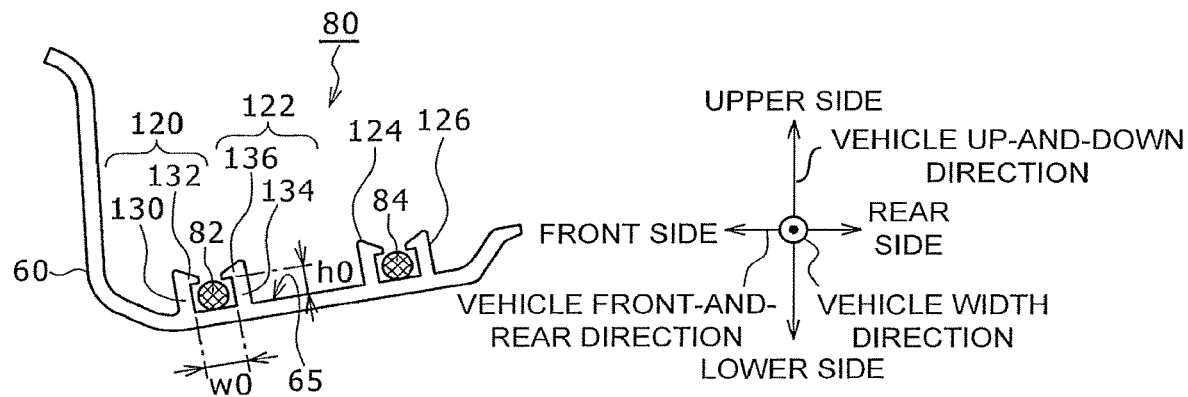
FIG. 4A is a diagram showing an example placement of a kick sensor on a rear floor cover in another embodiment of the present disclosure.

In the above, a configuration is described in which the kick sensor 80 is fixed onto the rear floor cover 60 using the floor cover rib portions 66 and 68 and the clip portions 106 and 110. Alternatively, in place of this structure, a plurality of locking hook-leg elements may be provided on the rear floor cover 60, and the signal lines 82 and 84 may be fixed by the locking hook-leg elements. FIG. 4A is a diagram showing a structure in which the kick sensor locking portions 100 and 102 described above with reference to FIGS. 2 and 3 are not provided, a pair of locking hook-leg elements 120 and 122 and a pair of locking hook-leg elements 124 and 126 are provided on the rear floor cover 60, and the two signal lines 82 and 84 are sandwiched and locked. In the example configuration of FIG. 3, 4 pairs of the locking hook-leg elements 120 and 122 and 4 pairs of the locking hook-leg elements 124 and 126 are placed in two rows in the width direction of the vehicle.

The pair of locking hook-leg elements 120 and 122 and the pair of the locking hook-leg elements 124 and 126 have the same structures, with a difference only in the signal line to be sandwiched. Therefore, in the following, the pair of locking hook-leg elements 120 and 122 for sandwiching the signal line 82 will primarily be described. The pair of locking hook-leg elements 120 and 122 include the locking hook-leg element 120 and the locking hook-leg element 122 which face each other in the front-and-rear direction of the vehicle with a predetermined sandwiching space w0 therebetween. The locking hook-leg element 120 has a leg 130 having a predetermined sandwiching height h0, and a locking hook 132 at a top of the leg 130. The leg 130 and the locking hook 132 are integrally molded with the inner wall surface 65 of the rear floor cover 60. Similarly, the locking hook-leg element 122 has a leg 134 having a predetermined sandwiching height h0 and a locking hook 136 at a top of the leg 134. The sandwiching space w0 and the sandwiching height h0 are set to be larger than a diameter of the signal line 82. A gap where the locking hook 132 and the locking hook 136 face each other is set to be smaller than the diameter of the signal line 82.

According to the above-described structure, on the inner wall surface 65 of the rear floor cover 60, the locking hook-leg elements 120 and 122 having the locking hooks 132 and 136 on the tips thereof are placed facing each other and forming a pair. Thus, the signal line 82 can be contacted and pressed into the region between the pair of facing locking hooks 132 and 136, to fix the signal line 82 onto the rear floor cover 60 via the locking hook-leg elements 120 and 122. With this configuration, the fixation operation of the signal line 82 can be facilitated, and a number of steps for the fixation operation can be reduced. The pair of locking hook-leg elements 124 and 126 have similar structures, and achieve similar advantages.

Figure 4B:
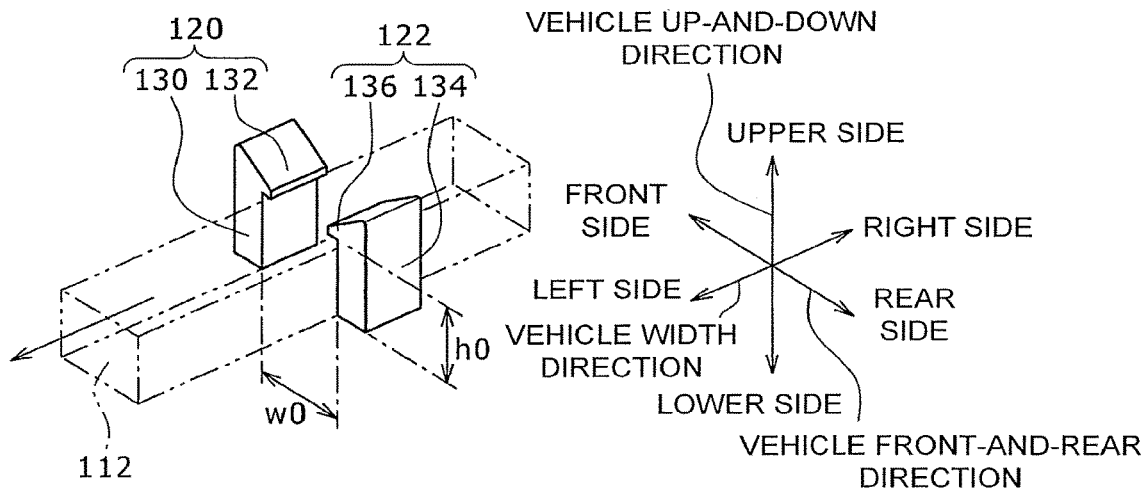
FIG. 4B is a diagram showing a molding method of a locking hook-leg element shown in FIG. 4A.

FIG. 4B is a diagram showing a method of molding the locking hook-leg elements 120 and 122 shown in FIG. 4A. In order to integrally mold the locking hooks 132 and 136 at the tops of the locking hook-leg elements 120 and 122 with the rear floor cover 60, in addition to one die for molding the overall outer shape, a slide die for leaving the space between the legs 130 and 134, of the locking hook-leg elements 120 and 122, which face each other is necessary. Depending on the specification of the lower structure 20, there may be cases where a region above the rear floor cover 60 cannot be set to a completely open space, and it becomes difficult to use the slide die which slides in the up-and-down direction of the vehicle. In such a case also, a slide die 112 in the width direction of the vehicle may be used. In the example configuration of FIG. 4A, because the space between the facing legs 130 and 134 of the locking hook-leg elements 120 and 122 is along the width direction of the vehicle, the slide die 112 may be used. Thus, in the integral resin molding of the rear floor cover 60 and the locking hook-leg elements 120 and 122, the slide die 112 is set in correspondence to the space between the legs 130 and 134, and, when the resin molding is completed, the slide die 112 is slid in a direction of an arrow in FIG. 4B. In this manner, the structure shown in FIG. 4A can be obtained.

In this manner, with the use of the slide die 112, the locking hook-leg elements 120 and 122 are integrally molded with the rear floor cover 60. Therefore, no special fixation component such as the double-sided adhesion sheet, the clip, or the like is necessary, and the cost can also be reduced.

Figure 5A:
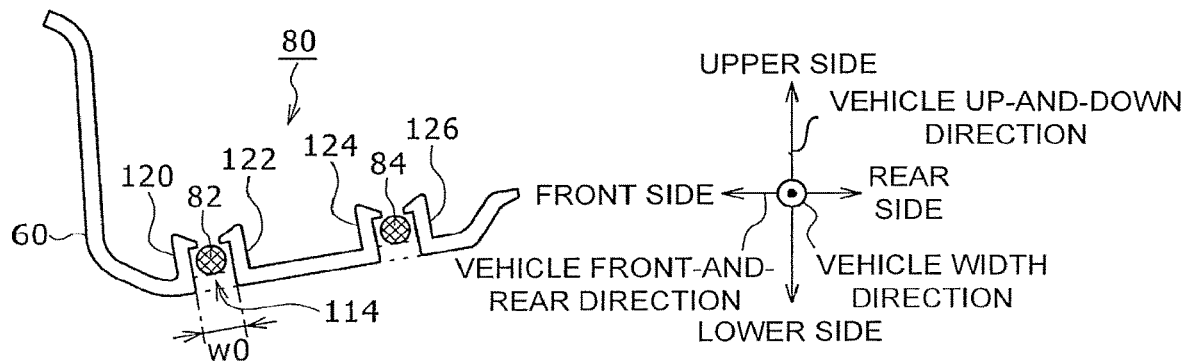
FIG. 5A is a diagram showing another form of a locking hook-leg element shown in FIG. 4A.
Figure 5B:
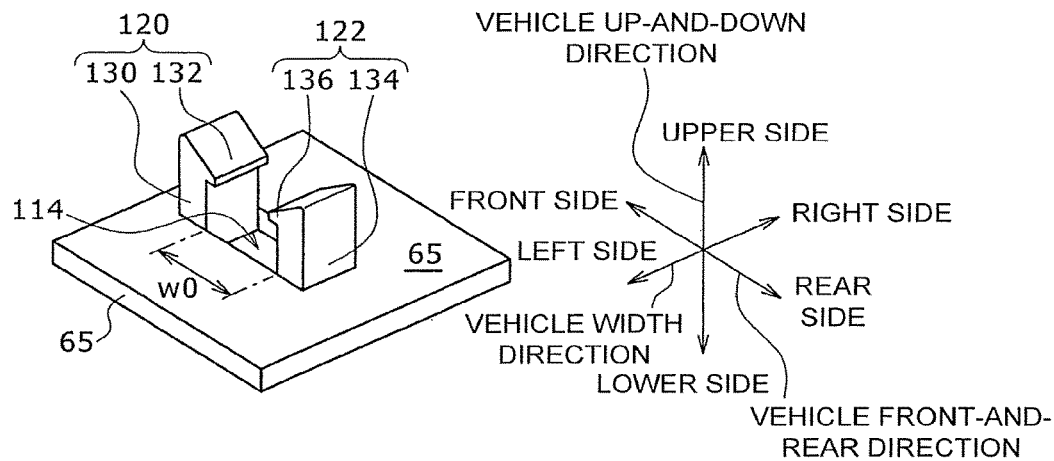
FIG. 5B is a perspective diagram of a region near the locking hook-leg element of FIG. 5A.

FIG. 5A is a diagram showing an example configuration in which the locking hook-leg elements 120 and 122 described above with reference to FIG. 4A are integrated with the rear floor cover 60 without the use of the slide die 112. This configuration differs from the configuration of FIG. 4A in that, in the rear floor cover 60, the portion, of the locking hook-leg elements 120 and 122, of the sandwiching space w0 where the legs 130 and 134 face each other is opened through, and a molding die passage hole 114 is formed. FIG. 5B is a perspective diagram corresponding to FIG. 4B.

Figure 5C:
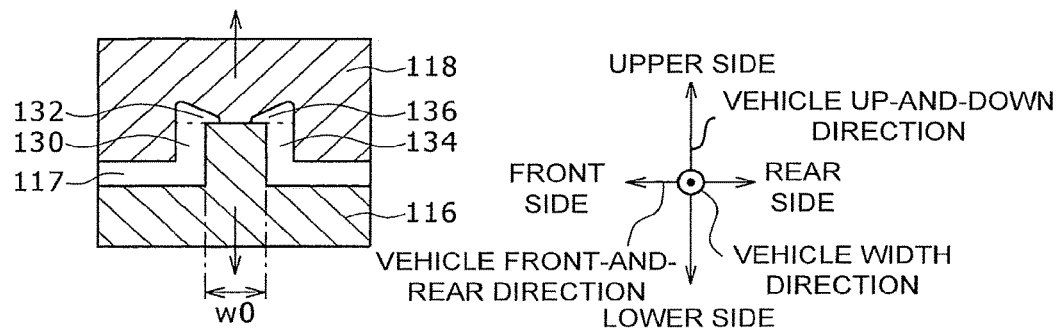
FIG. 5C is a diagram showing an example molding die for molding the locking hook-leg element of FIG. 5B.

FIG. 5C is a diagram showing a placement relationship between a lower die 116 and an upper die 118 during the resin molding. The lower die 116 has a shape extending through the molding die passage hole 114 to a boundary position between the legs 130 and 134 and the locking hooks 132 and 136. Using the lower die 116 and the upper die 118, the resin is filled into a cavity 117, and then, the lower die 116 and the upper die 118 are opened to the directions of the respective arrows, to obtain the structure of FIG. 5A.

According to the above-described structure, because the molding die passage hole 114 is provided, two dies including the lower die 116 and the upper die 118 can be used using the molding die passage hole 114, sandwiching the shapes of the locking hooks 132 and 136 at the tops of the locking hook-leg elements 120 and 122. With this configuration, the rear floor cover 60 and the locking hook-leg elements 120 and 122 can be integrally molded without the use of the slide die 112.

In the above, the kick sensor 80 is placed at the portion of the rear floor cover 60 in the closed cross-section space 26. Depending on the specification of the design of the rear part of the vehicle 10 or the like, there may be cases where a suitable placement surface for the kick sensor 80 can be reserved on the rear bumper cover 40. In this case, the kick sensor 80 is placed in the closed cross-section space 26, at a portion of the rear bumper cover 40 at a side nearer to the user 8 at the rear side of the vehicle. In the following, an example configuration will be described in which the kick sensor 80 is placed at the portion of the rear bumper cover 40.

Figure 6:
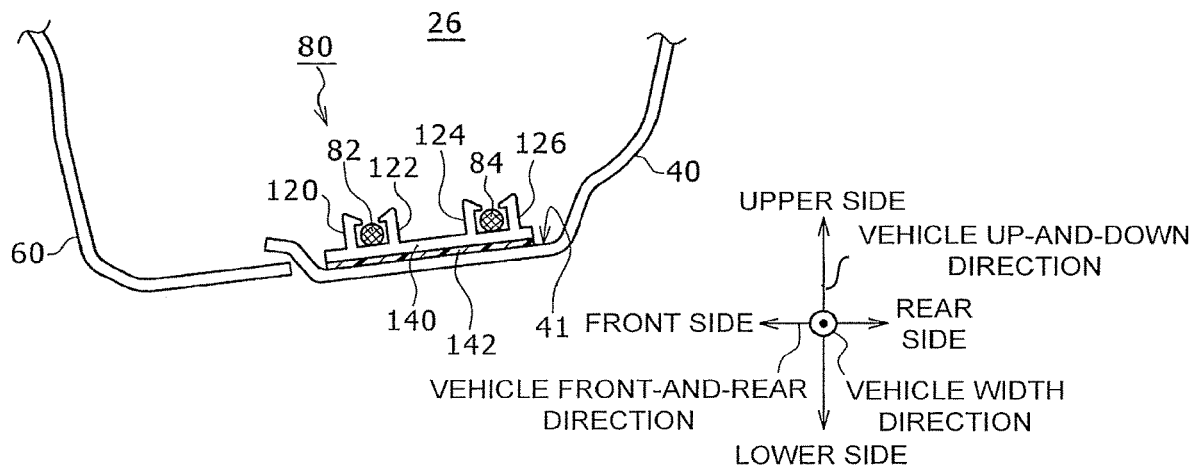
FIG. 6 is a perspective diagram showing a kick sensor placed on a rear bumper cover in a lower structure of a vehicle according to an embodiment of the present disclosure.

FIG. 6 is a diagram showing an example configuration in which the kick sensor 80 is placed at the portion of the rear bumper cover 60, in the closed cross-section space 26 surrounded by the connected structure of the rear bumper cover 40 and the rear floor cover 60 and formed on the side of the floor panel 30, isolated from the outside of the vehicle. As shown in FIG. 3, because the rear bumper cover 40 has bend portions at respective end sides in the width direction of the vehicle, and has a vertical wall portion at the rear side of the vehicle, there are a lot of restrictions on attachment of the kick sensor 80 onto the rear bumper cover 40. In consideration of this, in FIG. 6, a plate with a locking hook 140 is used. The plate with looking hook 140 is a structure in which the pair of locking hook-leg elements 120 and 122 and the pair of locking hook-leg elements 124 and 126 described above with reference to FIG. 4A are molded on a plate which is independent from the rear bumper cover 40. As described above with reference to FIG. 4A, 4 pairs of the locking hook-leg elements 120 and 122 are molded for the signal line 82, and 4 pairs of the locking hook-leg elements 124 and 126 are molded for the signal line 84. The plate with the locking hook 140 on which the pair of the locking hook-leg elements 120 and 122 and the pair of the locking hook-leg elements 124 and 126 are molded is fixed onto an inner wall surface 41 of the rear bumper cover 40 using a double-sided adhesion sheet 142. Because the kick sensor 80 is placed inside the closed cross-section space 26, entrance of foreign objects from the outside of the vehicle into the placement region of the kick sensor 80 can be suppressed, and the erroneous operation of the kick sensor 80 can be prevented.

Figure 7:
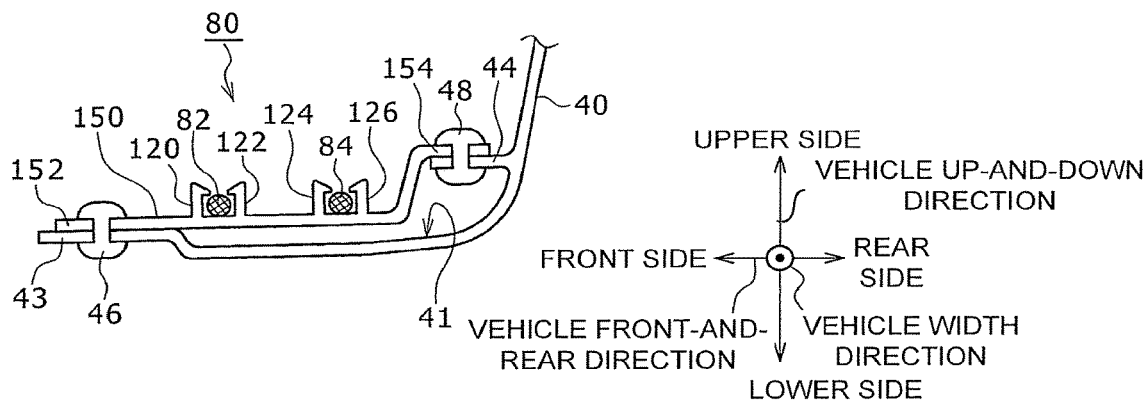
FIG. 7 is a diagram showing an example placement of a kick sensor on a rear bumper cover in another embodiment of the present disclosure.

When the plate with the locking hook 140 is fixed to the rear bumper cover 40 using the double-sided adhesion sheet 142, it becomes difficult to exchange the kick sensor 80. FIG. 7 is a diagram showing an example configuration of a plate with a locking hook 150, which does not use the double-sided adhesion sheet 142. The plate with the locking hook 150 differs from the plate with the locking hook 140 in that the plate with the locking hook 150 has a plurality of attachment holes at an edge thereof. In the example configuration of FIG. 7, the attachment holes are formed at an edge 152 at a front side of the vehicle and at an edge 154 at a rear side of the vehicle. In correspondence to these attachment holes, attachment portions 43 and 44 having attachment holes are provided from the inner wall surface 41 of the rear bumper cover 40. The attachment holes at the edges 152 and 154 of the plate with the locking hook 150 and the attachment holes of the attachment portions 43 and 44 of the rear bumper cover 40 are aligned, and the plate and the rear bumper cover are fixed to each other using suitable fastening members 46 and 48. As the fastening members 46 and 48, a combination of a bolt and a nut may be used, so that the plate with the locking hook 150 is detachable with respect to the rear bumper cover 40.

With the above-described structure, the kick sensor 80 can be detachably attached and fixed onto the rear bumper cover 40. Thus, unlike the configuration of FIG. 6 where the fixation is achieved using the double-sided adhesion sheet 142 or the like, exchange of the kick sensor 80 can be enabled. In addition, the fixation operation of the signal lines 82 and 84 can be facilitated, the cost of the double-sided adhesion sheet 142 can be reduced, and the number of steps for the attachment operation can be reduced.

Figure 8A:
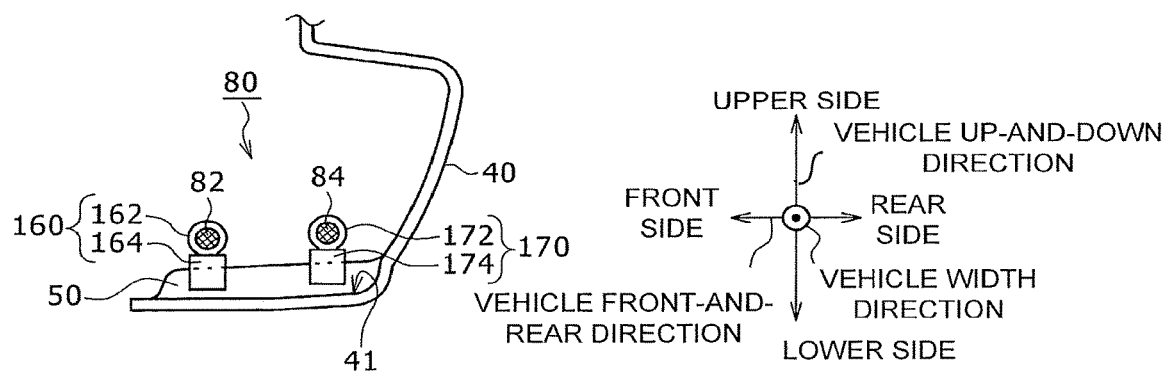
FIG. 8A is a diagram showing an example placement of a kick sensor on a rear bumper cover in another embodiment of the present disclosure.

FIG. 8A shows an example configuration in which a kick sensor locking portion having the clip as described above with reference to FIGS. 2 and 3 is used in place of the pair of locking hook-leg elements 120 and 122. Here, in consideration of the restriction of the integrated molding with the rear bumper cover 40, a bumper cover rib portion 50 integrally molded with the inner wall surface 41 of the rear bumper cover 40 is set to extend in the front-and-rear direction of the vehicle. In correspondence to the example configuration of FIG. 3, 4 bumper cover rib portions 50 are provided in the width direction of the vehicle. A kick sensor locking portion 160 provided on the signal line 82 and a kick sensor locking portion 170 provided on the signal line 84 are paired and are attached to the same bumper cover rib portion 50. That is, while a signal line retaining portion 162 of the kick sensor locking portion 160 encloses the signal line 82, a clip portion 164 sandwiches the bumper cover rib portion 50. Similarly, while a signal line retaining portion 172 of the kick sensor locking portion 170 encloses the signal line 84, a clip portion 174 sandwiches the bumper cover rib portion 50. Unlike the configuration of FIG. 3, the clip portions 164 and 174 open and close in the width direction of the vehicle.

Figure 8B:
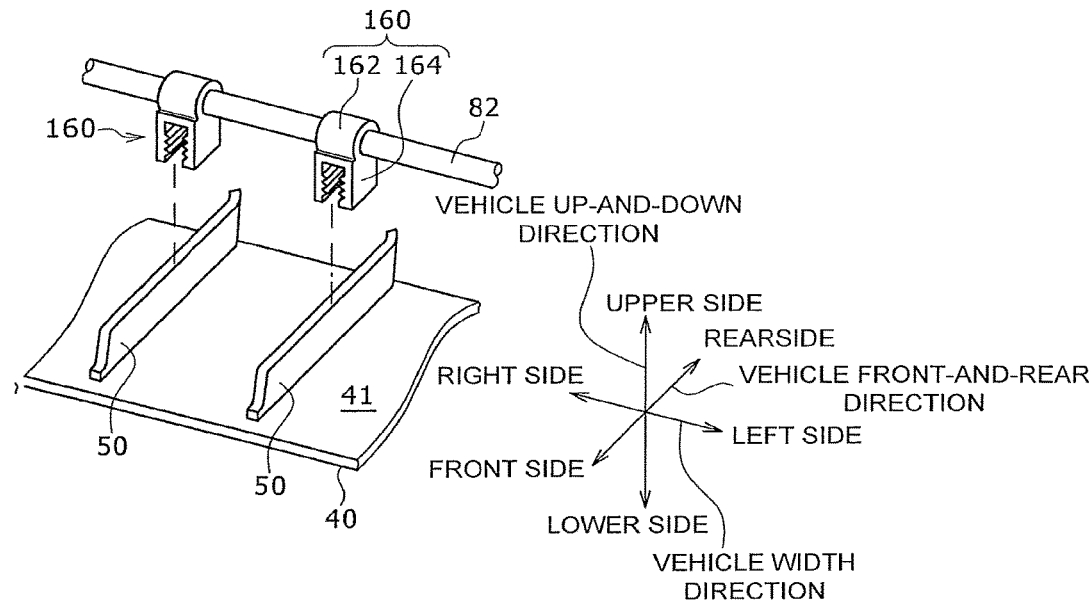
FIG. 8B is a diagram showing a relationship between a kick sensor and a bumper cover rib portion in FIG. 8A.

FIG. 8B is a perspective diagram of FIG. 8A. Here, two kick sensor locking portions 160 related to the signal line 82 are shown. Two kick sensor locking portions 160 related to the same signal line 82 are attached to the bumper cover rib portion 50 at different placement positions along the width direction of the vehicle.

According to the above-described structure, in the kick sensor 80, the bumper cover rib portion 50 can be sandwiched by the clip portions 164 and 174, and the signal lines 82 and 84 can thus be fixed. With this configuration, the kick sensor 80 can be detachably attached and fixed onto the rear bumper cover 40, and thus, for example, unlike a configuration where the kick sensor 80 is fixed using the double-sided adhesion sheet 142 of the like, exchange of the kick sensor 80 can be enabled. In addition, the fixation operation of the signal lines 82 and 84 can be facilitated, and the number of steps for the attachment operation can be reduced.

In the above description, the closed cross-section space 26 is described to be formed by being surrounded by the connected structure of the rear bumper cover 40 and the rear floor cover 60, and on the side of the floor panel 30, isolated from the outside of the vehicle. Depending on the specification of the vehicle 10, there may be cases where the vehicle 10 does not have the rear floor cover 60, but because there are only a small number of restrictions on the design of the rear part of the vehicle 10, a suitable placement surface for the kick sensor 80 can be reserved on the rear bumper cover 40. For such a vehicle 10, in place of the rear floor cover 60, the heat insulator 24 may be used, and the closed cross-section space 26 may be formed surrounded by a connected structure of the rear bumper cover 40 and the heat insulator 24 and on the side of the floor panel 30, isolated from the outside of the vehicle. In this case, the heat insulator 24 serves as the under cover for forming the closed cross-section space 26.

Figure 9:
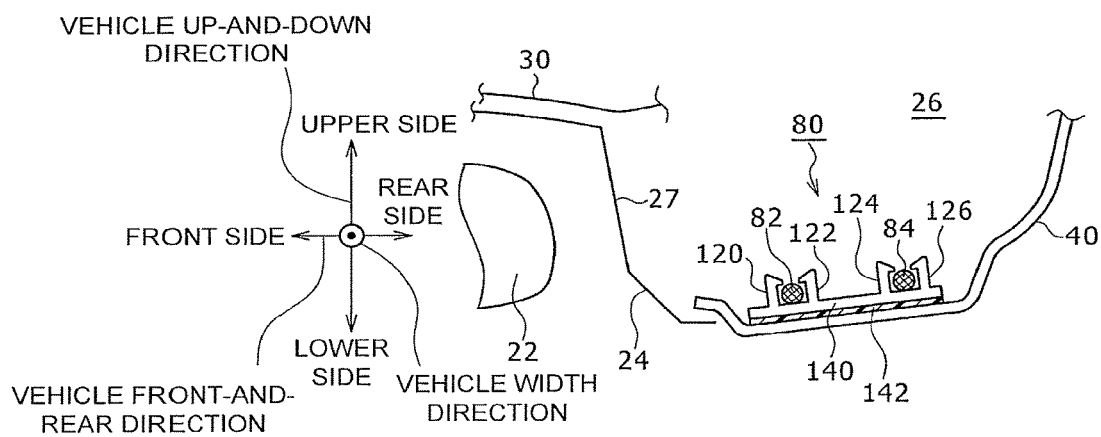
FIG. 9 is a cross-sectional diagram showing an example configuration in which an under cover is an insulator of a muffler, in a lower structure of a vehicle according to an embodiment of the present disclosure.

FIG. 9 is a diagram showing an example configuration where the closed cross-section space 26 is formed surrounded by the connected structure of the rear bumper cover 40 and the heat insulator 24, and on the side of the floor panel 30, isolated from the outside of the vehicle. Here, the vehicle 10 comprises the muffler 22 provided at a lower side in the up-and-down direction of the vehicle than the floor panel 30, and at the front side of the vehicle relative to the rear bumper cover 40. The heat insulator 24 which is one type of the under cover is provided between the muffler 22 and the rear bumper cover 40, and has a portion on the front side of the vehicle which extends between an upper surface of the muffler 22 and the floor panel 30. The heat insulator 24 extends from the portion on the front side of the vehicle via a vertical wall portion 27, and is connected to the rear bumper cover 40 at an end on the rear side of the vehicle. The kick sensor 80 is fixed to the portion of the rear bumper cover 40 using the plate with the locking hook 140 described above with reference to FIG. 6 and the double-sided adhesion sheet 142.

According to the above-described structure, the heat insulator 24 serving as the under cover is connected to the rear bumper cover 40, to form the closed cross-section space 26. The kick sensor 80 placed on the rear bumper cover 40 is at an inner side of the closed cross-section space 26, and thus, entrance of the foreign objects into the placement region of the kick sensor 80 can be suppressed and the erroneous operation of the kick sensor 80 can be prevented.

Figure 10:
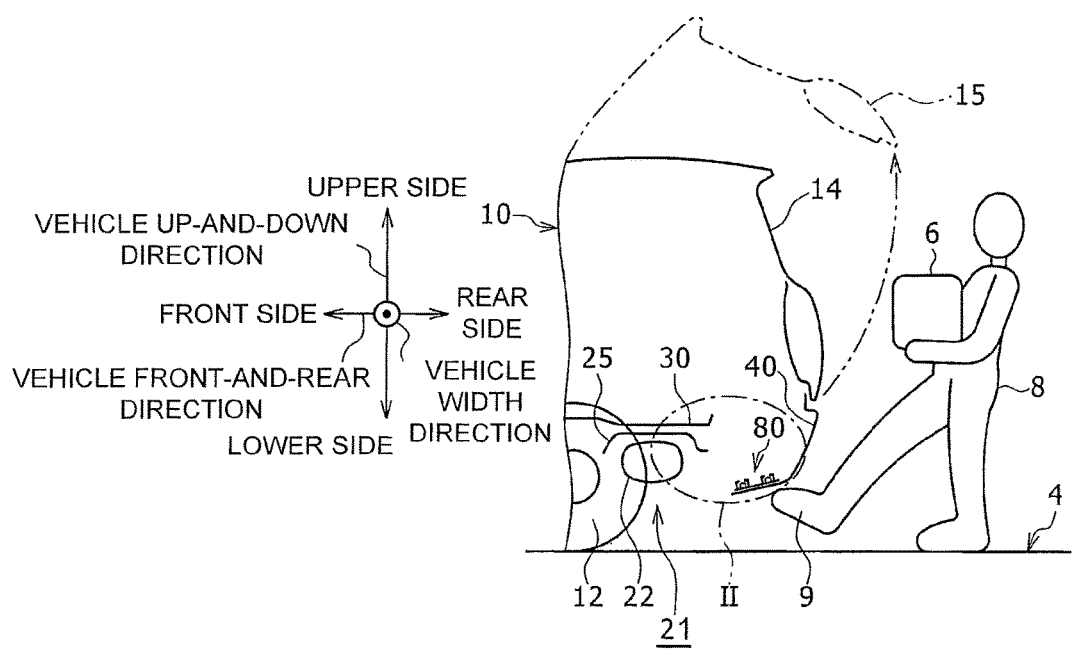
FIG. 10 is a diagram showing a lower structure of a vehicle according to related art.
Figure 11:
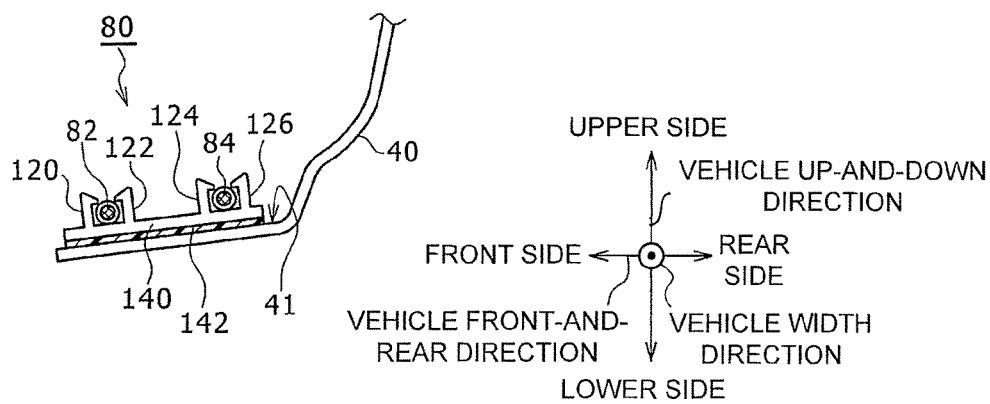
FIG. 11 is an enlarged view of a part II of FIG. 10.

FIG. 10 is a diagram showing a lower structure 21 of the related art in a drawing similar to FIG. 1, for comparison purposes. FIG. 11 is an enlarged view of a part II of FIG. 10. The kick sensor 80 is fixed to the rear bumper cover 40 by the plate with the locking hook 140 described above with reference to FIGS. 6 and 9, and the double-sided adhesion sheet 142. The lower structure 21 does not have a rear floor cover 60, but has a heat insulator 25. However, unlike the heat insulator 24 of FIG. 9, the heat insulator 25 does not have an end on the rear side of the vehicle connected to the rear bumper cover 40. Therefore, the closed cross-section space 26 isolated from the outside of the vehicle is not formed, and the kick sensor 80 is placed in a space which is open to the outside of the vehicle.

In this manner, in the lower structure 21 of the related art, the kick sensor 80 is placed in an open space with respect to the outside of the vehicle, and thus, foreign objects may enter from the outside of the vehicle into the placement region of the kick sensor 80, and the kick sensor 80 may erroneously operate. In addition, because the plate with the locking hook 140 is fixed to the rear bumper cover 40 using the double-sided adhesion sheet 142, exchange of the kick sensor 80 is difficult. In the contrary, in the lower structure 20 described above with reference to FIG. 1, the kick sensor 80 is placed in the closed cross-section space 26. Therefore, entrance of the foreign objects from the outside of the vehicle into the placement region of the kick sensor 80 can be suppressed and the erroneous operation of the kick sensor 80 can be prevented. In addition, because the kick sensor 80 is fixed to the rear floor cover 60 by sandwiching the floor cover rib portions 66 and 68 of the rear floor cover 60 using the clip portions 106 and 110 of the kick sensor locking portions 100 and 102, the kick sensor 80 can be easily exchanged.

The invention claimed is:

1. A lower structure of a vehicle, comprising:
    a rear bumper cover;
    an under cover that is provided at a lower side, in an up-and-down direction of the vehicle, than a floor panel of the vehicle, and at a front side of the vehicle relative to the rear bumper cover; and
    a kick sensor that has a signal line which extends in a width direction of the vehicle, and a sensor part placed on the signal line, wherein
    the kick sensor is placed inside a closed cross-section space surrounded by a connected structure of the rear bumper cover and the under cover and formed on a side of the floor panel, isolated from an outside of the vehicle.

2. The lower structure of the vehicle according to claim 1, wherein the under cover is a rear floor cover having an end on a front side of the vehicle connected to the floor panel and an end on a rear side of the vehicle connected to the rear bumper cover, and the kick sensor is placed at a portion of the rear floor cover in the closed cross-section space.

3. The lower structure of the vehicle according to claim 2, wherein the rear floor cover includes a plurality of floor cover rib portions integrated with and protruding from an inner wall surface facing the side of the floor panel, and that have a predetermined vertical wall thickness, the kick sensor includes a plurality of kick sensor locking portions, placed along a direction of extension of the signal line, each having a signal line retaining portion which supports the signal line by enclosing an outer circumferential side thereof, and a clip portion which is integrated with the signal line retaining portion and which can open and close in a front-and-rear direction of the vehicle, and the clip portion is locked to one of the plurality of floor cover rib portions.

4. The lower structure of the vehicle according to claim 2, wherein on the rear floor cover, a plurality of pairs of locking hook-leg elements are placed along the width direction of the vehicle, integral with an inner wall surface facing the side of the floor panel, each pair of locking hook-leg elements facing each other in a front-and-rear direction of the vehicle with a predetermined sandwiching space therebetween, and each locking hook-leg element having a locking hook at a top of a leg having a predetermined sandwiching height, and the kick sensor is locked by the signal line being sandwiched in the sandwiching space of the locking hook-leg elements.

5. The lower structure of the vehicle according to claim 4, wherein in the rear floor cover, a molding die passage hole corresponding to the sandwiching space is provided between the legs which face each other in the pair of the locking hook-leg elements.

6. The lower structure of the vehicle according to claim 1, wherein the kick sensor is placed at a portion of the rear bumper cover in the closed cross-section space.

7. The lower structure of the vehicle according to claim 6, wherein the kick sensor includes a plate with a locking hook in which, on an upper surface thereof, a plurality of pairs of locking hook-leg elements are placed along the width direction of the vehicle, each pair of locking hook-leg elements facing each other with a predetermined sandwiching space therebetween, and each locking hook-leg element having a locking hook at a top of a leg having a predetermined sandwiching height, and which has a plurality of attachment holes at an edge thereof, and the plurality of attachment holes of the plate with the locking hook are fastened and fixed by a fastening member to a plurality of attachment portions provided on an inner wall surface, of the rear bumper cover, facing the side of the floor panel.

8. The lower structure of the vehicle according to claim 6, wherein the rear bumper cover includes a plurality of bumper cover rib portions which are integrated with an inner wall surface facing the side of the floor panel, and which extend in a front-and-rear direction of the vehicle, the kick sensor includes a plurality of kick sensor locking portions, placed along a direction of extension of the signal line, each having a signal line retaining portion which supports the signal line by enclosing an outer circumferential side thereof, and a clip portion which is integrated with the signal line retaining portion and which can open and close in the width direction of the vehicle, and the clip portion is locked to one of the plurality of bumper cover rib portions.

9. The lower structure of the vehicle according to claim 1, wherein the under cover is a rear floor cover having an end on a front side of the vehicle connected to the floor panel and an end on a rear side of the vehicle connected to the rear bumper cover, and the rear floor cover includes a plurality of locking portions protruding from an inner surface of the rear floor cover and spaced in the width direction of the vehicle to detachably attach the signal line to the under cover.

10. The lower structure of the vehicle according to claim 1, wherein the sensor part is a first sensor part and the kick sensor includes a second sensor part which is spaced from the first sensor part along the signal line which extends in the width direction of the vehicle on a lower surface of at least one of the rear bumper cover and the under cover in the closed cross-section.

11. A lower structure of a vehicle, comprising:

a rear bumper cover;

an under cover that is provided at a lower side, in an up-and-down direction of the vehicle, than a floor panel of the vehicle, and at a front side of the vehicle relative to the rear bumper cover; and a kick sensor that has a signal line which extends in a width direction of the vehicle, and a sensor part placed on the signal line; and a muffler that is provided at a lower side, in the up-and-down direction of the vehicle, than the floor panel of the vehicle, and at a front side of the vehicle relative to the rear bumper cover, wherein the kick sensor is placed inside a closed cross-section space surrounded by a connected structure of the rear bumper cover and the under cover and formed on a side of the floor panel, isolated from an outside of the vehicle, the under cover is a heat insulator which is provided between the muffler and the rear bumper cover, which extends to the front side of the vehicle between an upper surface of the muffler and the floor panel, and which has an end on the rear side of the vehicle connected to the rear bumper cover, and the kick sensor is placed at a portion of the rear bumper cover in the closed cross-section space.

* * * * *